United States Patent [19]

DeYoung et al.

[11] 4,418,355

[45] Nov. 29, 1983

[54] INK JET APPARATUS WITH PRELOADED DIAPHRAGM AND METHOD OF MAKING SAME

[75] Inventors: Thomas W. DeYoung, Stormville; Hector Miranda, Yorktown Heights, both of N.Y.

[73] Assignee: Exxon Research and Engineering Co., Florham Park, N.J.

[21] Appl. No.: 336,601

[22] Filed: Jan. 4, 1982

[51] Int. Cl.[3] .......... G01D 15/18

[52] U.S. Cl. .......... 346/140 R

[58] Field of Search .......... 346/140 R

[56] References Cited

U.S. PATENT DOCUMENTS

| | | | |
|---|---|---|---|
| 4,072,959 | 2/1978 | Elmquist | 346/140 R |
| 4,115,789 | 9/1978 | Fischbeck | 346/140 R |
| 4,367,478 | 1/1983 | Larsson | 346/140 R |
| 4,383,264 | 5/1983 | Lewis | 346/140 R |

*Primary Examiner*—Joseph W. Hartary
*Attorney, Agent, or Firm*—Norman L. Norris

[57] ABSTRACT

An ink jet apparatus comprises a chamber having a diaphragm preloaded to a deformed position when the transducer is in the de-energized state. Upon energization of the transducer, the diaphragm returns to a substantially planar condition so as to permit filling of the chamber from an inlet prior to firing a droplet from a chamber orifice when the transducer is de-energized and the diaphragm again assumes it preloaded, deformed condition.

22 Claims, 7 Drawing Figures

INK JET APPARATUS WITH PRELOADED DIAPHRAGM AND METHOD OF MAKING SAME

BACKGROUND OF THE INVENTION

This invention relates to ink jets capable of ejecting droplets of ink.

An ink jet capable of ejecting a droplet of ink on demand is disclosed in copending application Ser. No. 336,603, filed Jan. 4, 1982 which is assigned to the assignee of this invention. The ink jet disclosed therein is capable of operating in a fill before fire mode, i.e., the chamber is expanded by energizing the transducer during filling of the chamber and the chamber contracts upon de-energization of the transducer at which time a droplet of ink is ejected. Such a fill before fire mode is to be contrasted with the more usual case of expanding the chamber during a state of de-energization of the transducer at which time filling occurs and contracting the chamber upon energization of the transducer at which time a droplet of ink is ejected.

In an ink jet which operates in a fill before fire mode, it is necessary that the deformable chamber wall follow the transducer motion such that the chamber can expand as the transducer contracts so as to permit filling of the chamber. The appropriate coupling between the deformable wall such as a diaphragm and the transducer may be achieved by mechanical fastening means such as a rivet or other means for attachment. However, such a mechanical fastening means may present reliability problems. Moreover, such mechanical fastening means may present difficult assembly problems where it will be appreciated that the dimensions of an ink jet are extremely small. Furthermore, mechanical fastening means may make it difficult to achieve the necessary precision so as to permit reproducability in ink jets, i.e., each ink jet in an array is identical to every other ink jet in the array to assure high quality printing from an array of ink jets. It is also important that the coupling between the transducer and the deformable wall or diaphragm not degrade over time, be stable with respect to temperature, low cost and resistant to any leakage of ink. It is further desirable that the fastening means be relatively low cost.

SUMMARY OF THE INVENTION

It is an overall object of this invention to provide improved coupling in a fill before fire ink jet between the transducer and the deformable wall of an ink jet chamber.

It is a more specific object of this invention to provide such a coupling which is readily reproduced with a high degree of precision.

It is a further object of this invention to provide such a coupling which is reliable.

It is a still further object of this invention to provide such a coupling which is readily manufacturable.

It is a still further object of this invention to provide such a coupling which is resistant to ink.

It is also an object of this invention which is stable with respect to temperature.

It is a still further object of this invention to provide such a coupling at relatively low cost.

In accordance with these and other objects of the invention, a preferred embodiment of the invention comprises an ink jet chamber including an ink droplet ejection orifice and a transducer means associated with the chamber. In accordance with the principles of fill before fire, the transducer moves away from the chamber when de-energized so as to expand the chamber and towards the chamber when de-energized so as to contract the chamber. Thus filling occurs during energization of the transducer and droplet ejection occurs during de-energization of the transducer.

In accordance with this invention, the ink jet chamber includes a deformable wall coupled to the transducer and the deformable wall is mechanically preloaded to a deformed position extending into the chamber and the transducer is de-energized and returns to a non-deformed position of substantially lesser extension into the chamber when the transducer is energized.

In one embodiment of the invention, viscoelastic means is provided for coupling the transducer to the wall portion. The viscoelastic means deforms the wall portion so as to preload the wall portion.

In another embodiment of the invention, coupling means comprises a foot attached to the transducer including a raised portion extending into contact with the deformable wall portion such that the wall portion is deformed during a state of energization of the transducer.

In yet another embodiment of the invention, the wall portion includes a raised portion juxtaposed to the foot of the transducer so as to deform the wall portion when the transducer is de-energized.

In all of the embodiments of the invention, the deformable wall portion is characterized by a memory and the deformable wall memeber is placed under tension when the transducer means is de-energized. A suitable deformable wall portion may comprise a diaphragm made from stainless steel.

In a particularly preferred embodiment of the invention, a plurality of ink jets are provided wherein each of the chambers include a deformable wall portion which is preloaded.

DETAILED DESCRIPTION OF THE PREFERRED EMBODIMENTS

Figure 1:
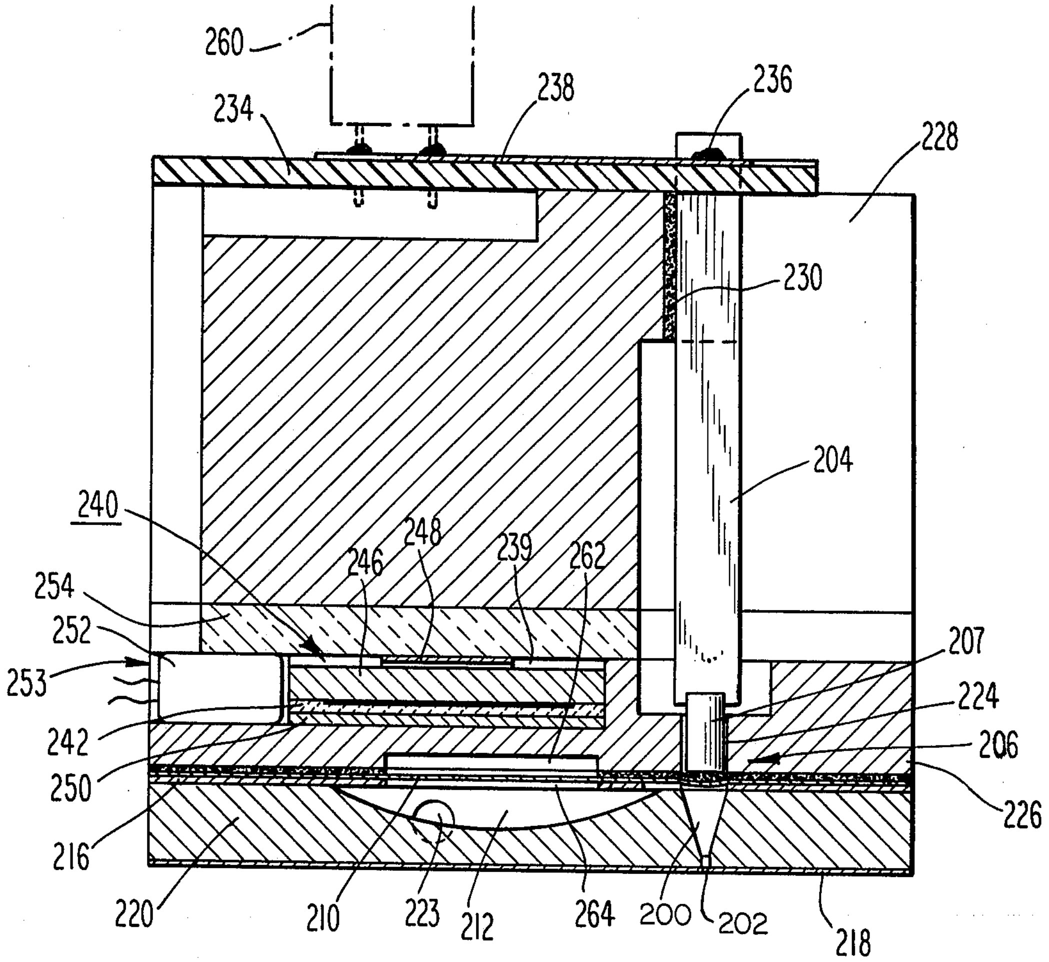
FIG. 1 is a sectional view of an ink jet apparatus representing a preferred embodiment of the invention.
Figure 3:
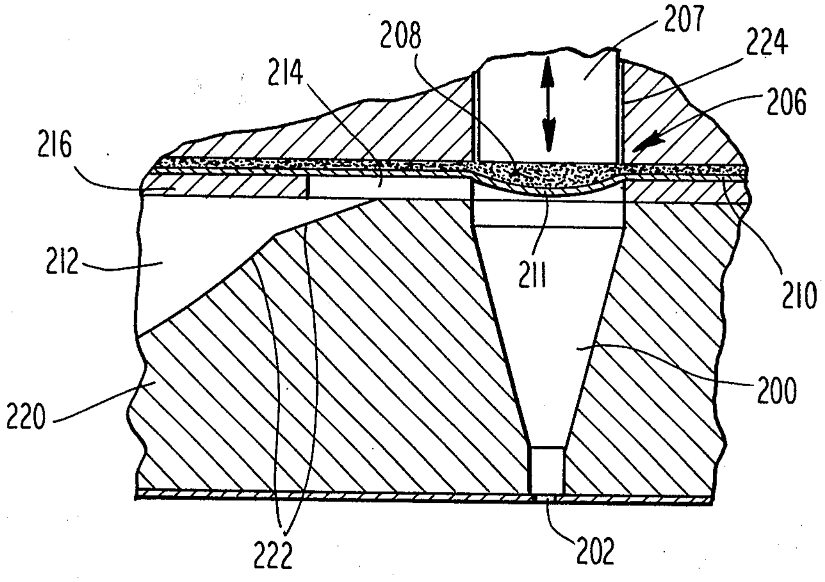
FIG. 3 is an enlarged view of a portion of FIG. 1.
Figure 2:
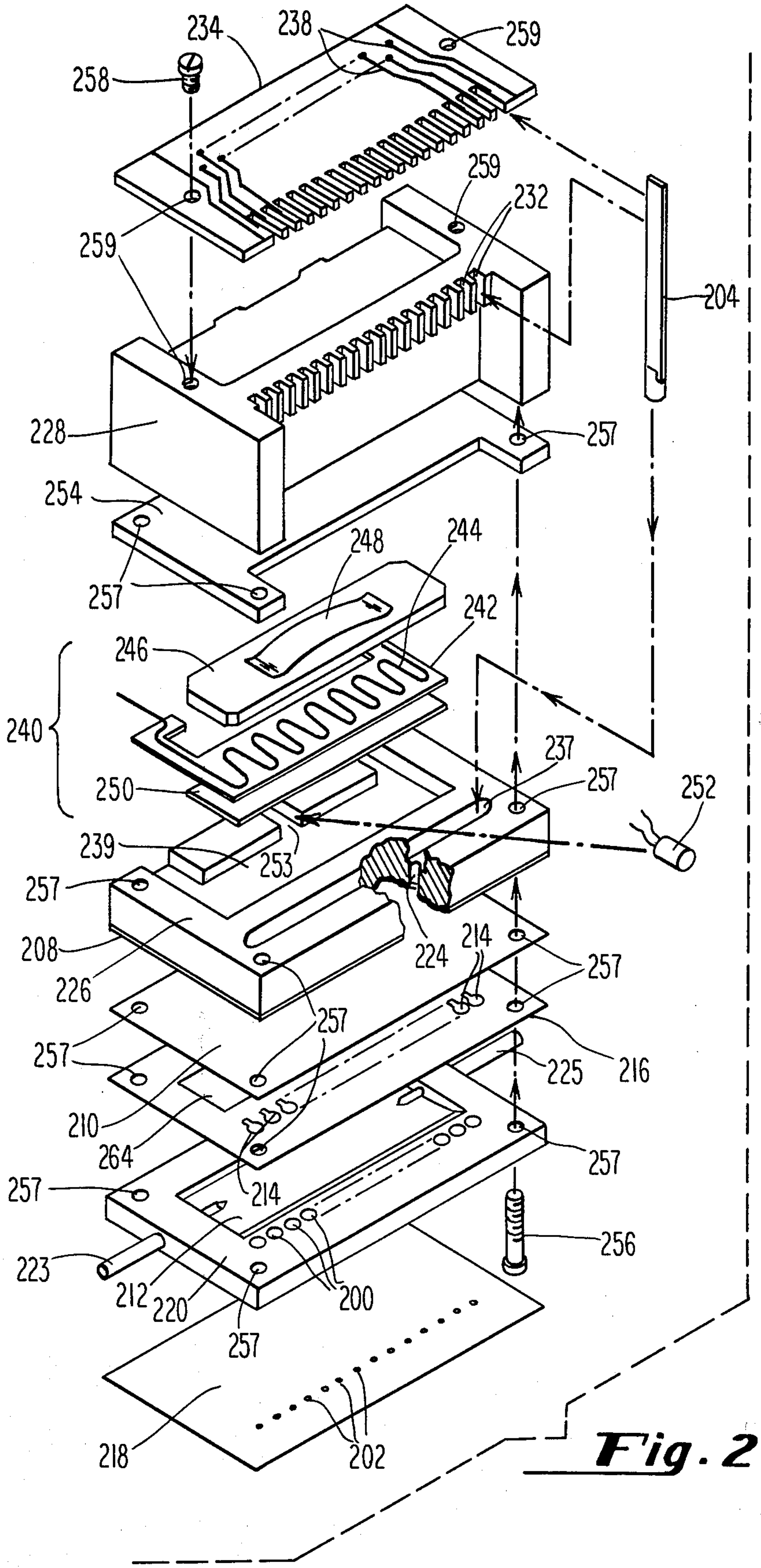
FIG. 2 is an exploded perspective view of the apparatus of FIG. 1 showing a plurality of ink jets in an array.

Referring to FIGS. 1 through 3, the chambers 200 having orifices 202 eject droplets of ink in response to the state of energization of a series of transducers 204 for the various jets in an array. Each transducer 204 expands and contracts in direction indicated by the arrow shown in FIG. 3 along the axis of elongation of the transducer, i.e., parallel with the axis of the orifice 202, and the movement of the transducer is coupled to the chamber 200 by coupling means 206 which includes a foot 207 and a diaphragm 210.

In accordance with this invention, the diaphragm 210 is preloaded into a deformed position shown in FIG. 3, i.e., a deformable chamber wall portion 211 of the diaphragm 210 bulges toward the orifice 202 as a result of the tension applied to the diaphragm 210. This tension applied to the diaphragm 210 is a function of viscoelectric material 208 forming part of the coupling means between the transducer 204 and the chamber 200. It will be noted that a substantial volume of the viscoelastic material 208 is collected between the deformed portion 211 of the diaphragm 210 and the foot 207 as compared with the amount of viscoelastic material 208 on either side of the foot 207.

In accordance with this invention, the diaphragm 210 assumes a substantially planar condition at the portion 211 as the transducer 204 is energized and contacts along the axis of elongation so as to permit filling of the chamber 200. On the other hand, de-energization of the transducer 204 allows the transducer 204 to expand along the axis of elongation such that the deformed portion 211 assumes the position shown in FIG. 3 at which time a droplet of ink is ejected from the orifice 202. A suitable transducer drive is shown in copending application Ser. No. 336,603, filed Jan. 4, 1982 which is assigned to the assignee of the invention and incorporated herein by reference.

When the diaphragm 210 assumes a substantially planar shape including the deformable portion 211, i.e., becomes undeformed, ink flows into the chamber 200 from a reservoir 212 through a restricted inlet means provided by a restricted opening 214 in a restrictor plate 216.

In accordance with the invention of copending application Ser. No. 336,603, filed Jan. 4, 1982, assigned to the assignee of this invention and incorporated herein by reference, the cross-sectional area of ink flowing into the chamber through the inlet 214 is substantially constant during expansion and contraction of the transducer 204, notwithstanding the location of the inlet 214 immediately adjacent the coupling means 206 and the transducer 204. By providing the inlet 214 with an appropriate size, vis-a-vis the orifice 202 in an orifice plate 218, the proper relationship between the impedance through the inlet 214 and the impedance through the orifice 202 may be maintained.

As shown in FIG. 3, the reservoir 212 which is formed in a chamber plate 220 includes a tapered edge 222 leading into the inlet 214 which is the invention of copending application Ser. No. 336,602, filed Jan. 4, 1982, assigned to the assignee of this invention and incorporated herein by reference. As shown in FIG. 2, the reservoir 212 is supplied by a feed tube 223 partially shown in FIG. 1 and a vent tube 225.

In accordance with the invention of copending application Ser. No. 336,600, filed Jan. 4, 1982 and Ser. No. 336,672, filed Jan. 4, 1982 assigned to the assignee of this invention and incorporated herein by reference, each of the transducers 204 shown in FIGS. 1 and 2 are guided at the extremities thereof with intermediate portions of the transducers 204 being essentially unsupported as best shown in FIG. 1. One extremity of the transducers 204 is guided by cooperation of the foot 207 with a hole 224 in a plate 226. As shown in FIG. 1, the hole 224 in the plate 226 is slightly larger in diameter than the diameter of the foot 207. As a consequence, there need be very little contact between the foot 207 and the wall of the hole 224 with the bulk of the contact which locates the foot 207 and thus supports the transducer 204 coming from the viscoelastic material 208 which preloads the diaphragm 210 in accordance with this invention. The other extremity of the transducer 204 is compliantly mounted in a block 228 by means of a compliant or elastic material 230 such as silicone rubber in accordance with the aforesaid copending application Ser. No. 336,600, which is incorporated herein by reference. The compliant material 230 is located in slots 232 shown in FIG. 2 so as to provide support for the other extremity of the transducers 204. Electrical contact with the transducers 204 is also made in a compliant manner by means of a compliant printed circuit 234 which is electrically coupled by suitable means such as solder 236 to the transducer 204. As shown in FIGS. 1 and 2, conductive patterns 238 are provided on the printed circuit 234.

As shown in some detail in FIGS. 1 and 3, the plate 226 including the hole 224 at the base of the slot 237 which receives the transducers 204 also includes a receptacle 239 for a heater sandwich 240 including a heater element 242 with coils 244 shown in FIG. 2, a hold down plate 246, a spring 248 associated with the plate 246 and a support plate 250 located immediately beneath the heater element 242. In order to control the temperature of the heater 242, a thermistor 252 is provided which is received in a slot 253. The entire heater 240 is maintained within the receptacle 239 in the plate 226 which is closed by an insulating cover 254.

As shown in FIG. 1, the entire structure of the apparatus including the various plates are held together by means of bolts 256 which extend upwardly through openings 257 in the structure and bolts 258 which extend downwardly through openings 259 so as to hold the printed circuit board 234 in place on the plate 228. Not shown in FIG. 2 but depicted in dotted lines in FIG. 1 are connections 260 to the printed circuits 238 on the printed circuit board 234.

As shown in FIG. 1, the plate 226 includes an area of relief 262 which extends along the length of the reservoir 212, is aligned with a hole 264 in the restrictor plate 216. This area of relief allows the diaphragm to be compliant in the area of the reservoir 212.

In accordance with one important aspect of this invention, a coating of the viscoelastic material 208 is attached to the bottom of the plate 226 as shown in FIG. 2. The viscoelastic material 208 is applied substantially uniformly to the plate 226 prior to assembly of the various plates as shown in FIG. 1. Once the various plates are squeezed down on one another and the bolts 257 are tightened, the viscoelastic material 208 tends to be squeezed into the areas where the diaphragm 210 will deform, i.e., the areas 211 juxtaposed to the transducers 204. Thus, viscoelastic material 208 actually deformed the diaphragm 210 in the region 211 so as to place the diaphragm 210 which may comprise stainless steel under tension.

Figure 4:
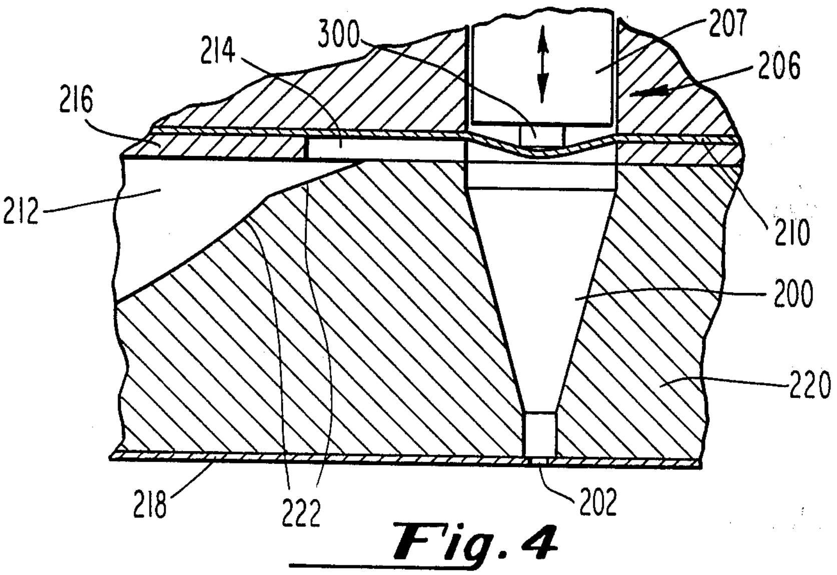
FIG. 4 is a sectional view of another embodiment of the invention.
Figure 5:
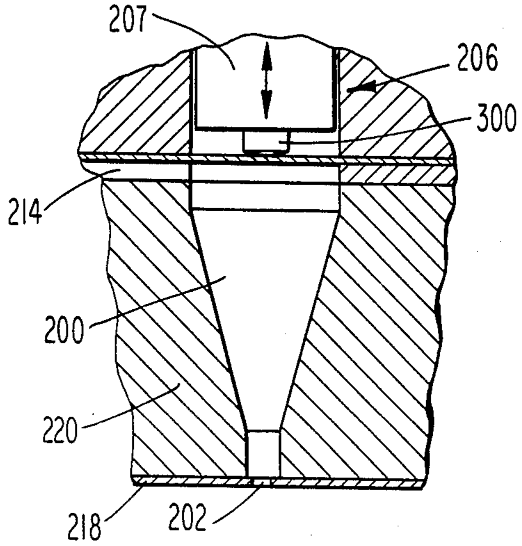
FIG. 5 is a sectional view of the embodiment of FIG. 4 showing the configuration of the ink jet chamber during filling.

Referring now to FIGS. 4 and 5, an embodiment of the invention is disclosed wherein the coupling means 206 comprising the foot 207 includes a raised portion 300 which preloads the diaphragm 210 as shown in FIG. 4 where the transducer 204 is de-energized or in the quiescent state, the diaphgram 210 is preloaded so as to be deformed. However, upon energization of the transducer 204, the transducer 204 contracts so as to allow the deformed portion 211 to return to the substantially planar position of the remainder of the diaphgram 210 as shown in FIG. 5.

Figure 6:
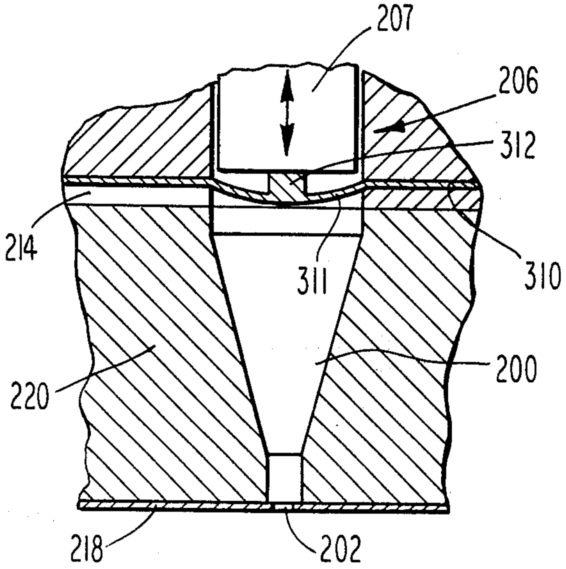
FIG. 6 is a sectional view of yet another embodiment of the invention.
Figure 7:
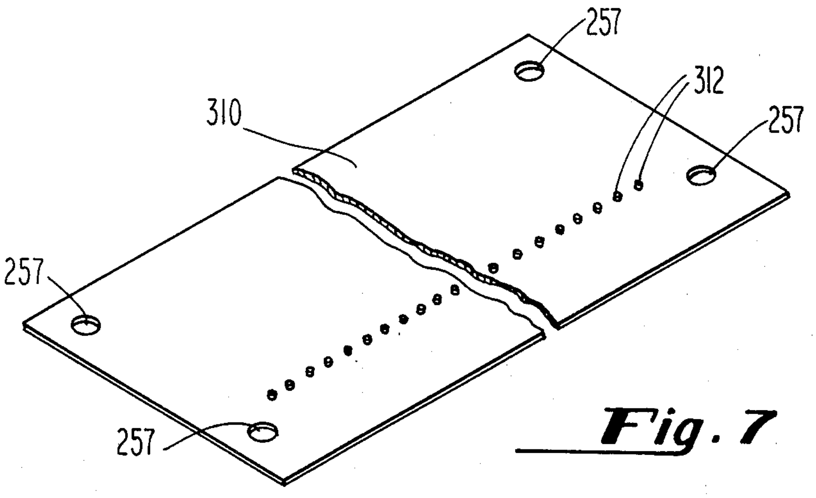
FIG. 7 is a perspective view of a diaphragm utilized in the embodiment of FIG. 6.

In the embodiment of FIGS. 6 and 7, a diaphragm 310 includes a raised portion 312 at each chamber 200. The raised portion 312 acting against the foot 207 serves to deform the diaphragm 310 in the region 311 at each chamber 200 and the the transducer is de-energized or in a state of rest. It will, of course, be appreciated that when the transducer is energized so as to retract the foot 207, each chamber 200 fills and the portion 311 will assume a substantially planar position with respect to the remainder of the diaphragm.

In accordance with another important aspect of the invention, the diaphragm 210 shown in FIGS. 4 and 5 is actually preloaded during assembly by the raised portion 300 to the position shown in FIG. 4. Simlarly, the diaphragm 310 is deformed to the position shown in FIG. 6 from the position shown in FIG. 7 during assembly due to the presence of each of the raised portions 312. As shown in FIG. 7, the diaphragm 310 may comprise integral raised portions 300 or raised portions of another material which are screened into place.

The viscoelastic material 208 may comprise a variety of materials including transfer adhesives (e.g. 3M company's acrylic base Scotchbrand A-10 acrylic adhesive Y-9460) and silicone gels. Such viscoelastic material acts as incompressible liquid thus transferring the load from the transducer to the foot, through the viscoelastic material and to the diaphragm. In a preferred embodiment of the invention, the diaphragm which may comprise stainless steel is approximately 0.013 mm thick, whereas the thickness of the viscoelastic material 208 is approximately 0.051 mm thick except at the chamber 200 where the viscoelastic material 208 takes on a maximum thickness of 0.064 mm to 0.127 mm so as to deform the diaphragm 210 a total of 0.038 to 0.102 mm into a chamber having a diameter of 1.016 mm to 1.524 mm. Similarly, the raised portion 300 and 312 have an overall height of 0.0127 mm to 0.0503 mm so as to deform the diaphragm 310 a total of 0.0076 mm to 0.046 mm. The diameters of the raised portions 300 and 312 are substantially smaller than the diameter of the foot 270 and the chamber 200.

It will be appreciated that the bending of the diaphram when preloaded may vary from that actually depicted in the drawings.

Although particular embodiments of the invention have been shown and described, other embodiments and modifications will occur to those of ordinary skill in the art which fall within the true spirit and scope of the invention as set forth in the appended claims.

We claim:

1. An ink jet apparatus comprising:
- an ink jet chamber including an ink droplet ejection orifice;
- transducer means; and
- a deformable wall portion coupled to said transducer means and located between said transducer means and said chamber and forming a portion of said chamber, said wall portion mechanically preloaded to a deformed position extending into said chamber when said transducer means is in a de-energized state and returning to a position of lesser extension nto the chamber when the transducer is in an energized state.

2. The ink jet apparatus of claim 1 further comprising viscoelastic means coupling said transducer to said wall portion and preloading said wall portion to a deformed position.

3. The ink jet apparatus of claim 1 further comprising a foot coupled to said transducer, having a raised portion deforming said wall portion.

4. The ink jet apparatus of claim 1 wherein said wall portion includes a raised portion coupled to said transducer means.

5. The ink jet apparatus of claim 1 wherein said deformable wall portion is characterized by a memory.

6. The ink jet apparatus of claim 3 wherein said deformable wall portion is under tension when the transducer means is de-energized.

7. An ink jet apparatus comprising:
- an ink jet chamber including an ink droplet ejection orifice and a deformable wall;
- transducer means coupled to said deformable wall, said transducer moving away from said chamber when energized and towards said chamber when de-energized;
- said deformable wall being mechanically preloaded to a deformed position extending into said chamber when said transducer means is in a de-energized state and returning to a non-deformed position of substantially lesser extension into said chamber when said transducer means is in an energized state.

8. The ink jet apparatus of claim 7 further comprising viscoelastic means coupling said transducer to said wall portion and preloading said wall portion to a deformed position.

9. The ink jet apparatus of claim 7 further comprising a foot coupled to said transducer, having a raised portion deforming said wall portion.

10. The ink jet apparatus of claim 7 wherein said wall portion includes a raised portion juxtaposed to said transducer means.

11. The ink jet apparatus of claim 7 wherein said deformable wall portion is characterized by a memory.

12. The ink jet apparatus of claim 7 wherein said deformable wall portion is under tension when said transducer means is in a de-energized state.

13. A method of fabricating an ink jet apparatus comprising:
- forming a substantial portion of an ink jet chamber including an ink droplet ejection orifice and a substantial opening;
- placing a diaphragm over said substantial opening; and
- preloading said diaphragm by coupling a transducer means to said diaphragm so as to deform said diaphragm into said chamber through said substantial opening when said transducer means is in a de-energized state and to retract said diaphragm from said chamber when said transducer means is in the de-energized state.

14. The method of claim 13 wherein deformation results from the squeezing of viscoelastic means between said transducer means and said diaphragm.

15. The method of claim 13 wherein deformation results from contact between a raised foot member contacting said raised portion on the diaphragm and transducer coupling means.

16. The method of claim 13 wherein deformation results from contact between a raised portion on transducer coupling means and said diaphragm.

17. An ink jet array comprising a plurality of ink jets, each of said jets comprising:
- an ink jet chamber including an ink droplet ejection orifice and a deformable wall;
- transducer means coupled to said deformable wall, said transducer moving away from said chamber when energized and towards said chamber when de-energized;

said deformable wall being mechanically preloaded to a deformed position extending into said chamber when said transducer means is in a de-energized state and returning to a non-deformed position of substantially lesser extension into said chamber when said transducer means is in an energized state.

18. The ink jet apparatus of claim 17 further comprising viscoelastic means coupling said transducer to said wall portion and preloading said wall portion to a deformed position.

19. The ink jet apparatus of claim 17 further comprising a foot coupled to said transducer, having a raised portion deforming said wall portion.

20. The ink jet apparatus of claim 17 wherein said wall portion includes a raised portion juxtaposed to said transducer means.

21. The ink jet apparatus of claim 17 wherein said deformable wall portion is characterized by a memory.

22. The ink jet apparatus of claim 17 wherein said deformable wall portion is under tension when said transducer means is in a de-energized state.

* * * * *